(12) United States Patent
An

(10) Patent No.: US 11,493,184 B2
(45) Date of Patent: Nov. 8, 2022

(54) FIXTURE INCLUDING LIGHT GUIDE AND AEROSOL GENERATING DEVICE INCLUDING THE FIXTURE

(71) Applicant: KT&G CORPORATION, Daejeon (KR)

(72) Inventor: Hwi Kyeong An, Seoul (KR)

(73) Assignee: KT&G CORPORATION, Daejeon (KR)

( * ) Notice: Subject to any disclaimer, the term of this patent is extended or adjusted under 35 U.S.C. 154(b) by 0 days.

(21) Appl. No.: 17/044,176

(22) PCT Filed: Mar. 5, 2020

(86) PCT No.: PCT/KR2020/003116
§ 371 (c)(1),
(2) Date: Sep. 30, 2020

(87) PCT Pub. No.: WO2020/180128
PCT Pub. Date: Sep. 10, 2020

(65) Prior Publication Data
US 2021/0033261 A1    Feb. 4, 2021

(30) Foreign Application Priority Data

Mar. 6, 2019 (KR) ........................ 10-2019-0025864

(51) Int. Cl.
| | |
|---|---|
| *F21V 7/00* | (2006.01) |
| *F21V 5/02* | (2006.01) |
| *A24F 40/40* | (2020.01) |
| *F21L 4/00* | (2006.01) |
| *F21V 13/04* | (2006.01) |
| *A24B 15/16* | (2020.01) |

(52) U.S. Cl.
CPC ............ *F21V 7/0083* (2013.01); *A24F 40/40* (2020.01); *F21L 4/005* (2013.01); *F21V 5/02* (2013.01); *F21V 7/0075* (2013.01); *F21V 13/045* (2013.01); *A24B 15/165* (2013.01); *F21V 2200/20* (2015.01)

(58) Field of Classification Search
CPC ....... F21V 7/0083; F21V 5/02; F21V 2200/20
See application file for complete search history.

(56) References Cited

U.S. PATENT DOCUMENTS

| | | | |
|---|---|---|---|
| 6,224,223 | B1 | 5/2001 | Higuchi et al. |
| 8,931,912 | B2 | 1/2015 | Nirei |
| 10,634,839 | B2 | 4/2020 | Oh |

(Continued)

FOREIGN PATENT DOCUMENTS

| | | |
|---|---|---|
| CN | 103424800 A | 12/2013 |
| CN | 204146334 U | 2/2015 |

(Continued)

OTHER PUBLICATIONS

International Search Report for PCT/KR2020/003116 dated Jun. 12, 2020 [PC/ISA/210].

(Continued)

*Primary Examiner* — Joseph L Williams
(74) *Attorney, Agent, or Firm* — Sughrue Mion, PLLC

(57) ABSTRACT

Provided is a fixture including a base; and a light guide, which is positioned on the base and is configured to receive light emitted from a light source in a first direction and guide the received light to be emitted in a second direction crossing the first direction.

14 Claims, 4 Drawing Sheets

(56) References Cited

U.S. PATENT DOCUMENTS

| | | |
|---|---|---|
| 10,842,196 B2 | 11/2020 | Frobisher |
| 2005/0018104 A1 | 1/2005 | Lee et al. |
| 2006/0221268 A1 | 10/2006 | Ko et al. |
| 2008/0186726 A1 | 8/2008 | Okada |
| 2008/0198624 A1 | 8/2008 | Lundin et al. |
| 2014/0056026 A1 | 2/2014 | Boomgaarden et al. |
| 2014/0307433 A1 | 10/2014 | Kim et al. |
| 2018/0149794 A1 | 5/2018 | Oh |

FOREIGN PATENT DOCUMENTS

| | | |
|---|---|---|
| CN | 204376430 U | 6/2015 |
| CN | 107616554 A | 1/2018 |
| CN | 107645963 A | 1/2018 |
| CN | 207400339 U | 5/2018 |
| CN | 108303190 A | 7/2018 |
| CN | 207964112 U | 10/2018 |
| JP | 3-203045 A | 9/1991 |
| JP | 4-340919 A | 11/1992 |
| JP | 11-183729 A | 7/1999 |
| JP | 2000-3611 A | 1/2000 |
| JP | 2007-79298 A | 3/2007 |
| JP | 2009-252380 A | 10/2009 |
| JP | 2010-519689 A | 6/2010 |
| JP | 2013-149502 A | 8/2013 |
| JP | 2014-2958 A | 1/2014 |
| JP | 2014-135120 A | 7/2014 |
| JP | 2016-157611 A | 9/2016 |
| JP | 3213257 U | 10/2017 |
| KR | 10-2004-0062797 A | 7/2004 |
| KR | 10-2007-0081037 A | 8/2007 |
| KR | 10-2012-0051830 A | 5/2012 |
| KR | 10-2014-0123134 A | 10/2014 |
| KR | 10-1475045 B1 | 12/2014 |
| KR | 10-2017-0112278 A | 10/2017 |
| KR | 10-2018-0061881 A | 6/2018 |
| TW | I405929 B1 | 8/2013 |
| WO | 2014/148729 A1 | 9/2014 |

OTHER PUBLICATIONS

Written Opinion forPCT/KR2020/003116 dated Jun. 12, 2020 [PCT/ISA/237].
Korean Office Action for 10-2019-0025864 dated Mar. 6, 2019.
Office Action dated Oct. 12, 2021, issued by the Japanese Patent Office in application No. 2020-558000.
Extended European Search Report dated Mar. 16, 2022 in European Application No. 20767269.2.
Office Action dated Feb. 24, 2022 (received Mar. 10, 2022) in Chinese Application No. 202080001805.1.
Communication dated Sep. 13, 2022 from the Japanese Patent Office in Japanese Application No. 2020-558000.

[Fig. 1A]
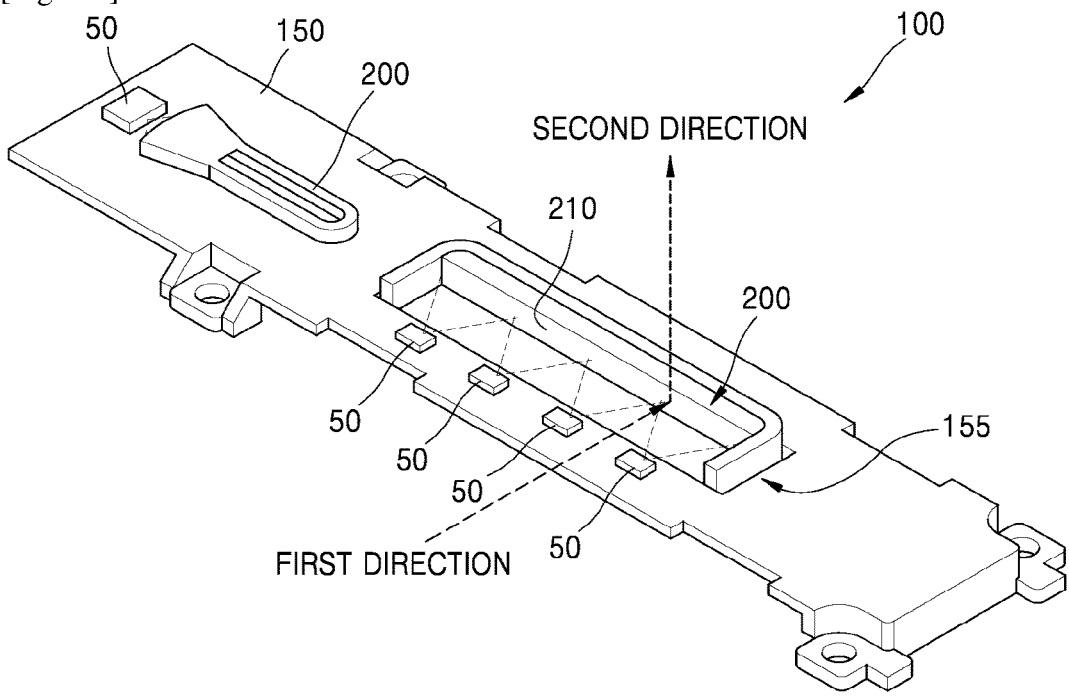
[Fig. 1B]
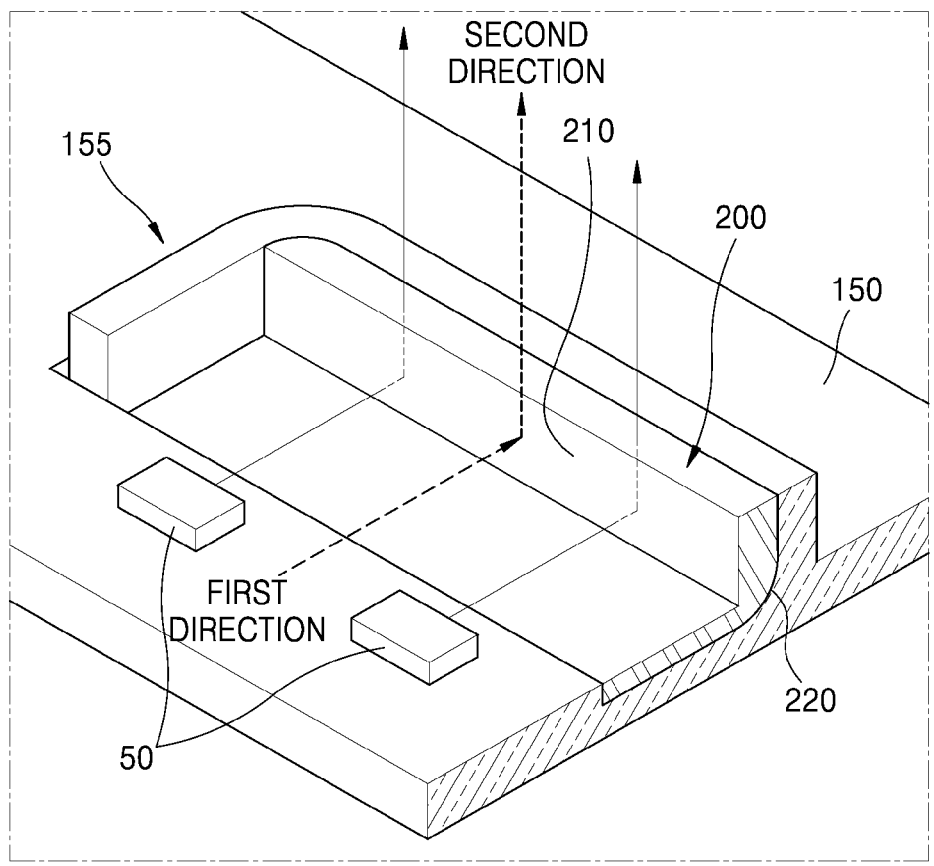

[Fig. 2A]
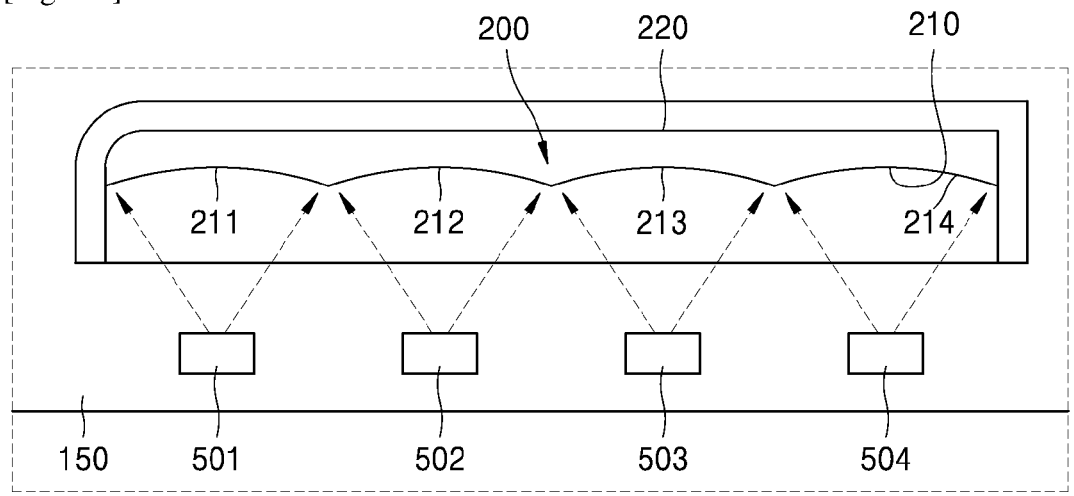
[Fig. 2B]
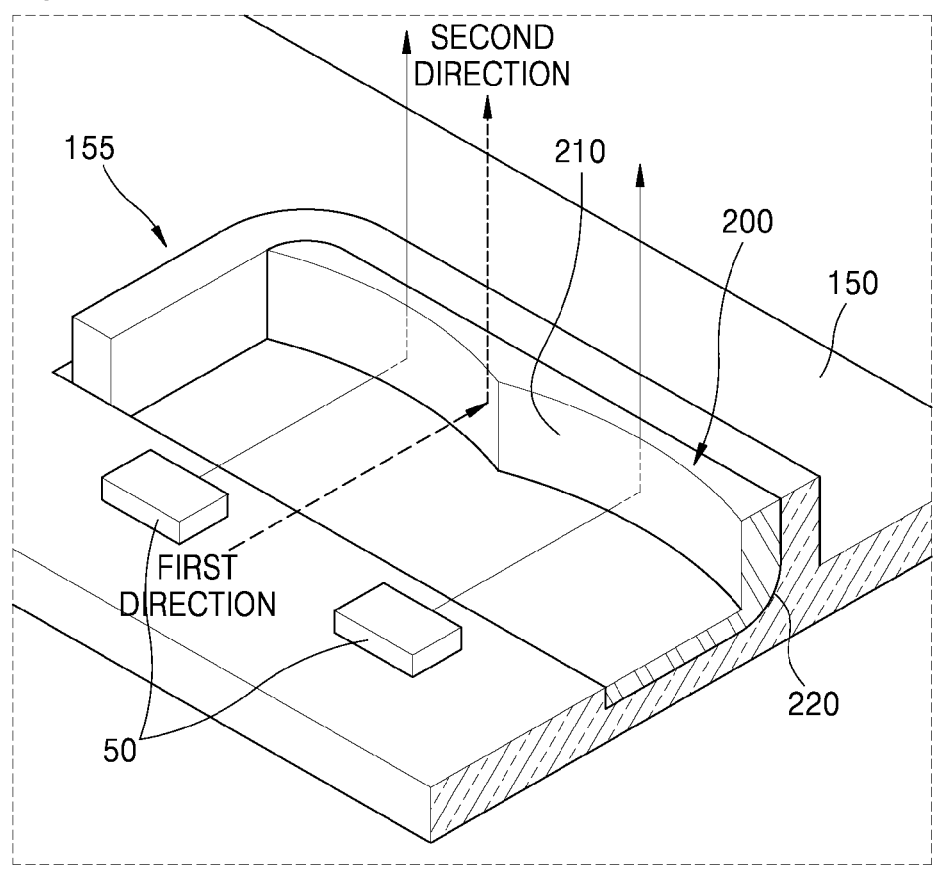

[Fig. 3]
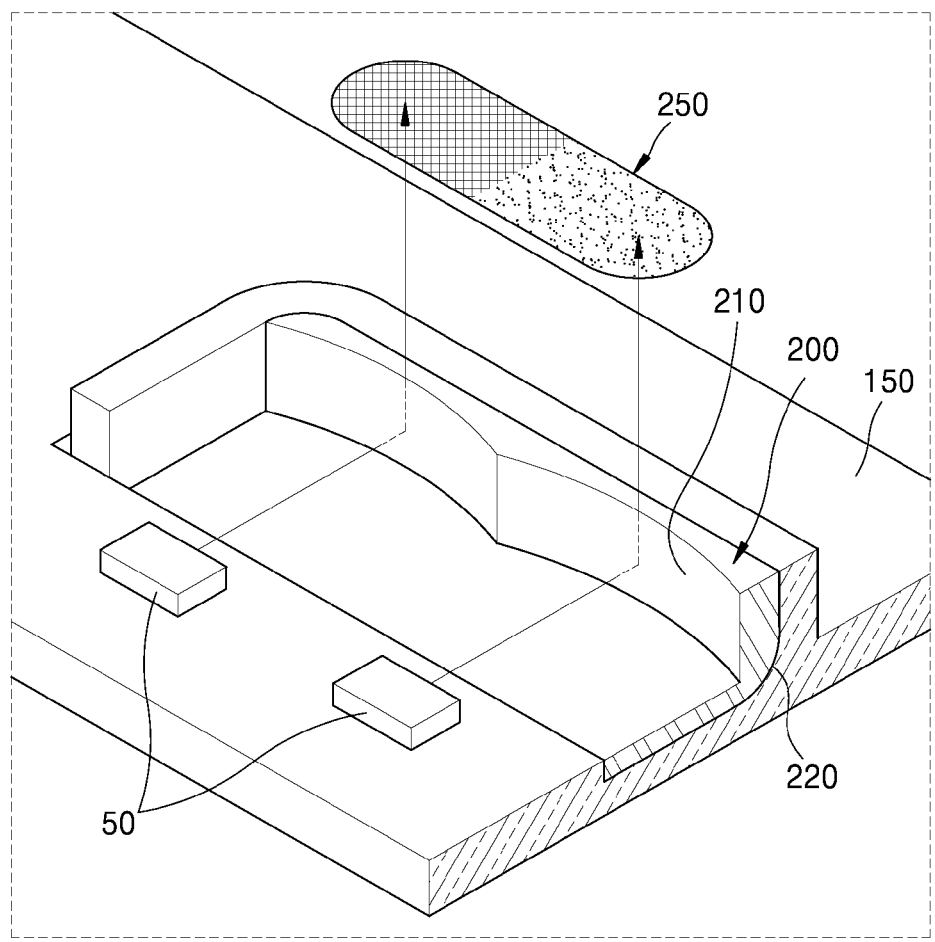
[Fig. 4]
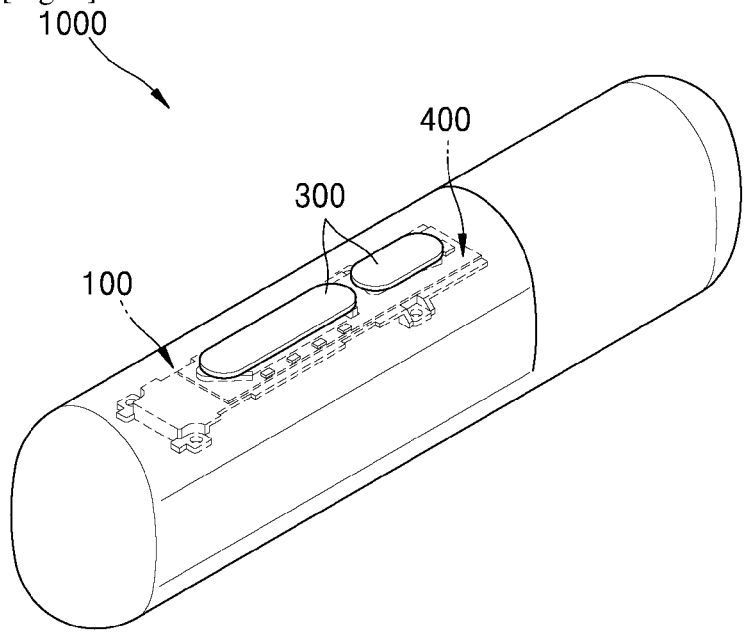

[Fig. 5]
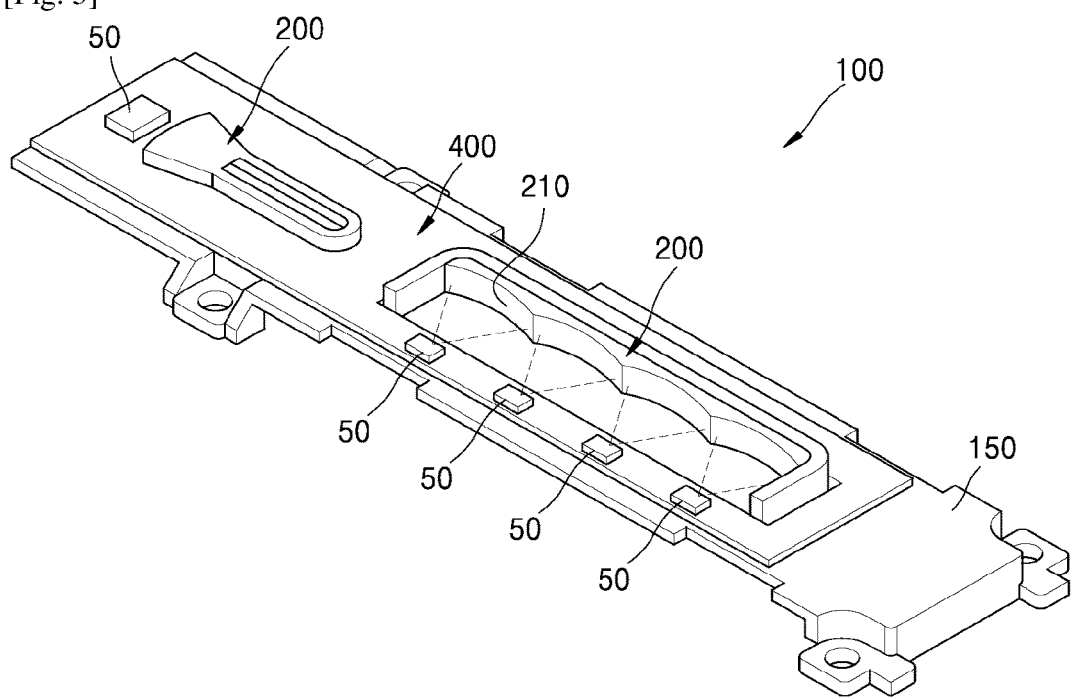
[Fig. 6A]
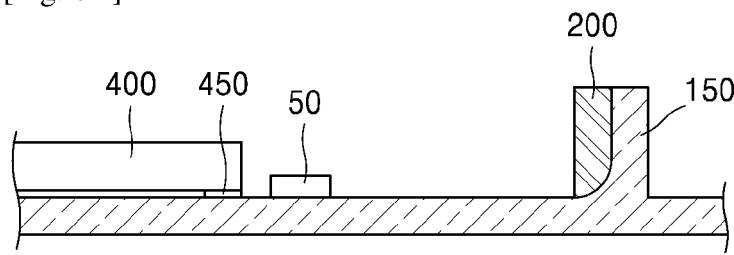
[Fig. 6B]
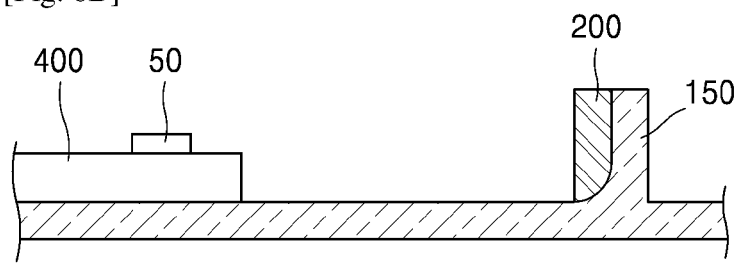

FIXTURE INCLUDING LIGHT GUIDE AND AEROSOL GENERATING DEVICE INCLUDING THE FIXTURE

CROSS REFERENCE TO RELATED APPLICATIONS

This application is a National Stage of International Application No. PCT/KR2020/003116 filed Mar. 5, 2020, claiming priority based on Korean Patent Application No. 10-2019-0025864 filed Mar. 6, 2019.

TECHNICAL FIELD

One or more example embodiments relate to a fixture including a light guide and an aerosol generating device including the fixture, and more particularly, to a fixture including a light guide configured to receive light emitted from a light source in a first direction and guide the received light to be emitted in a second direction crossing the first direction and an aerosol generating device including the fixture.

BACKGROUND ART

In the related art, a light collecting module includes a light guide for guiding light, a light collector for condensing light, and a reflector for reflecting light as separate components. When the light guide, the light collector, and the reflector are provided as separate components, separate spaces for the respective components are needed in a device. Therefore, there is a limit in utilizing the space inside a device where the light collecting module is installed.

Also, in a related art light collecting module, the light guide, the light collector, and the reflector are manufactured as separate components, and thus, it is necessary to combine the components to one another, wherein cracks or gaps in or between the components may be easily formed in the process of combining the components to one another. Cracks or gaps in or between the components may affect a path of light when the light collecting module guides light, thereby causing difficulty in executing precise guidance of light.

DISCLOSURE

Technical Solution

One or more example embodiments provide a fixture that includes a light guide configured to receive light emitted from a light source in a first direction and guide the received light to be emitted in a second direction crossing the first direction.

One or more example embodiments provide an aerosol generating device including a fixture, the fixture including a light guide.

Technical problems to be solved are not limited to the technical problems as described above, and other technical problems may be derived from the below embodiments.

According to an example embodiment of the disclosure, a fixture including a light guide configured to guide light is provided, wherein a light collector configured to condense light and a reflector configured to reflect light to adjust a path of the light are integrally formed and guide light. Also, a fixture including a light guide according to embodiments may not only guide light, but also fix the components inside a device including the fixture.

According to an example embodiment of the disclosure, a fixture including a light guide may be applied to various electronic devices, including a heating-type aerosol generating device that is being actively researched in recent years. The heating-type aerosol generating device may include, for example, a device for generating and inhaling an aerosol by heating an aerosol generating material in a cigarette instead of generating an aerosol by burning a cigarette.

Advantageous Effects

In a fixture including a light guide according to example embodiments, a light collector that condenses light to be guided by the light guide and a reflector for reflecting light to adjust a path of the light are integrally formed.

Also, a fixture including a light guide according to example embodiments may not only guide light, but also fix components inside a device including the fixture.

Accordingly, since no separate space is needed for components (e.g., the light collector and the reflector) of each light collecting module, an internal space of a device on which the light collecting module is mounted may be efficiently utilized.

Also, in a fixture including a light guide according to example embodiments, since the components of a light collecting module are integrally formed, cracks or gaps that may occur in the process of combining the components may be prevented.

Therefore, light may be stably and effectively guided and emitted toward the outside, thereby forming a brighter and clearer light region.

A fixture including a light guide according to example embodiments may guide light and, at the same time, fix the components inside a device including the fixture to predetermined positions.

DESCRIPTION OF DRAWINGS

FIG. 1A is a perspective view of a fixture including a light guide according to an example embodiment.

FIG. 1B is a partial cross-sectional view of the light guide included in the fixture according to the example embodiment shown in FIG. 1A.

FIG. 2A is a plan view of a fixture including a light guide according to another example embodiment.

FIG. 2B is a partial cross-sectional view of the light guide included in the fixture according to the example embodiment shown in FIG. 2A.

FIG. 3 is a diagram showing an example of a light region formed by light passed through the light guide in the fixture according to the example embodiment shown in FIGS. 2A and 2B.

FIG. 4 is a diagram showing an aerosol generating device including a fixture according to example embodiment.

FIG. 5 is a perspective view of a fixture in the aerosol generating device according to the example embodiment shown in FIG. 4.

FIGS. 6A and 6B are lateral cross-sectional views of a fixture according to example embodiments based on positions of a light source.

BEST MODE

According to an aspect of an example embodiment, provided is a fixture including: a base; and a light guide positioned on the base and is configured to receive light emitted from a light source in a first direction and guide the received light to be emitted in a second direction crossing the first direction.

The fixture may further include: a light collector configured to receive the light emitted from the light source, the light collector positioned on a first surface of the light guide, the first surface facing the light source; and a reflector configured to reflect light guided from the light collector to the reflector by the light guide, the reflector positioned on a second surface and a bottom surface of the light guide, the second surface being opposite the first surface, the light collector receives the light emitted from the light source in the first direction and guide the received light to the reflector, and the reflector reflects and emits the guided light in the second direction.

The reflector may have a curvature to reflect the light, guided to the reflector by the light guide in the first direction, in the second direction.

The reflector may include a mirror surface.

The light guide may include a protrusion protruding in the second direction from the base.

The fixture may include a plurality of light guides.

A surface of the light guide facing toward the second direction may include fine projections.

The light guide may include a light-transmitting material.

The light-transmitting material may include a scatterer.

The light collector may be further configured to have a concave shape in a direction facing toward the light source.

The light collector may include a plurality of light collectors respectively corresponding to a plurality of light sources, and each of the plurality of light collectors may be configured to have a concave shape in a direction facing toward each of the corresponding plurality of light sources.

The reflector may be further configured to reflect light, emitted from each of the plurality of light sources and guided to the reflector by the light guide via each of the corresponding plurality of light collectors, in the second direction.

According to an aspect of an example embodiment, provided is an aerosol generating device including: the fixture including the light guide of claim 1; the light source configured to emit the light toward the light guide of the fixture; and a light emitting unit configured to receive light from the light guide of the fixture and transmit the light toward an outside.

The aerosol generating device may further include a printed circuit board (PCB) circuit board, wherein the PCB circuit board is mounted to the fixture and is fixed at a predetermined position in the aerosol generating device.

The aerosol generating device may further include a controller, and a battery, wherein the controller is configured to control the light source to control a display of a remaining battery power by using the light emitting unit.

MODE FOR INVENTION

With respect to the terms in the various example embodiments, the general terms which are currently and widely used are selected in consideration of functions of structural elements in the various example embodiments of the disclosure. However, meanings of the terms can be changed according to intention, a judicial precedence, the appearance of a new technology, and the like. In addition, in certain cases, a term which is not commonly used can be selected. In such a case, the meaning of the term will be described in detail at the corresponding portion in the description of the disclosure. Therefore, the terms used in the various example embodiments of the disclosure should be defined based on the meanings of the terms and the descriptions provided herein.

In addition, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and operation and can be implemented by hardware components or software components and combinations thereof.

It will be understood that when an element or layer is referred to as being "over," "above," "on," "connected to" or "coupled to" another element or layer, it can be directly over, above, on, connected or coupled to the other element or layer or intervening elements or layers may be present. In contrast, when an element is referred to as being "directly over," "directly above," "directly on," "directly connected to" or "directly coupled to" another element or layer, there are no intervening elements or layers present. Like numerals refer to like elements throughout.

The term used in the specification is for the purpose of describing example embodiments and is not intended to be limiting of the disclosure. In the specification, the singular forms also include meaning of the plural unless specifically stated otherwise in the text.

Hereinafter, the disclosure will now be described more fully with reference to the accompanying drawings, in which example embodiments of the disclosure are shown such that one of ordinary skill in the art may easily understand the inventive concept of the disclosure. The disclosure may, however, be embodied in many different forms and should not be construed as being limited to the example embodiments set forth herein.

FIG. 1A is a perspective view of a fixture 100 including a light guide 200 according to an example embodiment, and FIG. 1B is a partial cross-sectional view of the light guide 200 in the fixture 100 according to the example embodiment shown in FIG. 1A.

Referring to FIGS. 1A and 1B, the fixture 100 including the light guide 200 according to an example embodiment will be described in more detail.

The fixture 100 including the light guide 200 according to an example embodiment includes a base 150; and the light guide 200, which is located on the base 150, receives light emitted from a light source 50 in a first direction, and guides the received light to be emitted in a second direction crossing the first direction.

A light collector 210 that receives light emitted from the light source 50 may be formed on a first surface of the light guide 200 to face the light source 50, and a reflector 220 may be formed on a second surface of the light guide 200, which is a surface opposite to the first surface. In an example embodiment, the second surface of the light guide 200 may be integrated with a bottom surface of the light guide 200 to form the reflector 220. Here, the light collector 210 receives light emitted from the light source 50 in the first direction and guides the received light to the reflector 220, and the reflector 220 reflects and emits the guided light in the second direction.

The fixture 100 including the light guide 200 according to an example embodiment may include the base 150 and the light guide 200 located on the base 150. One or more fixing units for fixing the fixture 100 may be formed at the base 150 of the fixture 100.

For example, the fixing units may include grooves for accommodating screws, rivets, pins, etc. However, the fixing units are not limited thereto and may include any form or structure based on which the fixture 100 may be fixed. In an example embodiment, a plurality of fixing units may be formed at corners of the base 150, and the locations and the number of the fixing units may vary as needed.

The light guide 200 of the fixture 100 according to an example embodiment may be located at the base 150. A surrounding portion 155 surrounding at least one of surfaces of the light guide 200 may be formed at the base 150 to support the light guide 200.

For example, the surrounding portion 155 may support the light guide 200 by surrounding at least one of the surfaces of the light guide 200, wherein the surrounding portion 155 may surround a surface of the light guide 200 that is opposite to a surface of the light guide 200 that faces the light source 50 so as not to interfere the path of light emitted from the light source 50.

The surrounding portion 155 may include a white-based material to reflect light that may leak from the light guide 200 back to the light guide 200.

The light guide 200 may guide light in a manner such that light, emitted from the light source 50 and is received by the light guide 200 in the first direction, and the received light is guided by the light guide 200 in the second direction crossing the first direction. In other words, the light guide 200 may receive the light emitted from the light source 50 in the first direction, where the first direction may be a direction in which the light emitted from the light source 50 travels toward the light guide 200.

The light guide 200 may guide the received light to be emitted in the second direction, which is a direction crossing the first direction. The light guide 200 may guide light emitted from the light source 50 to proceed in a predetermined path, wherein the second direction in which the light guide 200 emits light may be a direction crossing the first direction in which the light emitted from the light source 50 is received.

The light collector 210 for receiving light emitted from the light source 50 may be formed on the first surface of the light guide 200 of the fixture 100 in a direction facing toward the light source 50 according to an example embodiment. In other words, the light collector 210 for receiving light emitted from the light source 50 may be formed on a surface of the light guide 200 facing the light source 50 from among the surfaces of the light guide 200. The light collector 210 may include a mirror surface capable of reflecting light with a surface roughness of Ra 1.

The reflector 220 may be provided on the bottom surface of the light guide 200 in association with or integrally with the second surface opposite to the first surface from among the surfaces of the light guide 200 of the fixture 100 according to an example embodiment.

The configuration of the light guide 200 will be described below in more detail with reference to FIG. 1B, which is a partial cross-sectional view of the light guide 200 included in the fixture 100 according to the example embodiment shown in FIG. 1A.

From among the surfaces of the light guide 200, the second surface of the light guide 200, which is opposite to the first surface of the light guide 200 on which the light collector 210 is provided, and the bottom surface of the light guide 200 may integrally form the reflector 220. The bottom surface of the light guide 200 forming the reflector 220 together with the second surface of the light guide 200 may be a surface at which the light guide 200 and the base 150 contact each other.

The bottom surface of the light guide 200 and the second surface of the light guide 200 may form the reflector 220 having an inclined surface having a constant slope. In other words, the reflector 220 may have an inclined surface inclined upward in a direction away from the light source 50, wherein the inclined surface may have a constant slope.

Also, the bottom surface of the light guide 200 and the second surface of the light guide 200 may integrally form a curved surface in which the slope thereof changes as the distance from the bottom surface of the light guide 200 increases. In other words, the reflector 220 may have a curved surface inclined upward in a direction away from the light source 50, wherein the slope of the curved surface may be changed.

The curved surface of the reflector 220 may have a concave shape (that is, a concave surface) and may have a pre-set curvature to reflect light, guided toward the light guide 200 in the first direction, in the second direction. For example, referring to FIG. 1B, the first direction may be a direction in which light emitted from the light source 50 proceeds toward the light guide 200, and the second direction may be a direction in which light reflected by the reflector 220 of the light guide 200 proceeds out of the light guide 200.

Also, the reflector 220 may include a mirror surface capable of reflecting light with a surface roughness of Ra≤1.

The light guide 200 of the fixture 100 according to an example embodiment may be a protrusion protruding from the base 150 in a direction toward the second direction. The light guide 200 is located at the base 150 of the fixture 100, and the light guide 200 may protrude in the second direction, which is a direction away from a first surface of the base 150. The second direction may be a direction in which light passed through the light guide 200 is emitted.

The surrounding portion 155 may have a shape that surrounds at least one of the surfaces of the light guide 200 to support the light guide 200, and may have a shape that at least partially surrounds the reflector 220 of the light guide 200 as shown in FIG. 1B. The surrounding portion 155 may have a shape in accordance with at least a portion of the reflector 220 that is surrounded by the surrounding portion 155.

As the light guide 200 forms a protrusion protruding from the base 150 in the second direction, the surrounding portion 155 having a shape surrounding at least one of the surfaces of the light guide 200 to support the light guide 200 may also protrude from the base 150.

The surrounding portion 155 may include a white material to reflect light that may leak from the light guide 200 back to the light guide 200.

The fixture 100 according to an example embodiment may include a plurality of light guides 200. In this case, at least one light source 50 may be disposed to emit light toward each of the plurality of light guides 200. The plurality of light guides 200 may be spaced apart from one another and may constitute a predetermined arrangement.

When the fixture 100 includes the plurality of light guides 200, a device including the fixture 100 may have a plurality of light emitting functions. For example, light emitted from a first light guide among the plurality of light guides 200 may display an ON and/or OFF operation state of the device, light emitted from a second light guide among the plurality of light guides 200 may display a remaining battery power of the device, and light emitted from a third light guide among the plurality of light guides 200 may display whether the device is in normal operation, or whether any damages are made to the device.

The surface of the light guide 200 of the fixture 100 facing toward the second direction (e.g., an upper surface of the light guide 200) may include fine projections. In the fixture 100 according to an example embodiment, light received and guided by the light guide 200 may pass through the surface of the light guide 200 facing toward the second direction and proceeds away from the light guide 200.

The fine projections formed on the surface of the light guide 200 facing toward the second direction may be a plurality of projections protruding in the second direction from the surface of the light guide 200, and a size and a shape of the plurality of projections may be changed as needed. When the surface of the light guide 200 facing toward the second direction includes the fine projections, light scattering may be increased, and thus brighter light may be emitted toward the outside.

The light guide 200 of the fixture 100 according to an example embodiment may include a light-transmitting material. The light-transmitting material may include glass or plastic, but is not limited thereto. For example, the light guide 200 may be formed of transparent glass or plastic, and thus light emitted from the light source 50 may be incident into the light guide 200.

In addition, a light-transmitting material forming the light guide 200 may include a scatterer (or a light-scattering material). When the light transmitting material forming the light guide 200 includes a scatterer, light may be scattered more effectively inside the light guide 200.

As described above, in the fixture 100 including the light guide 200 according to an example embodiment, the light collector 210 of the light guide 200 may receive light emitted from the light source 50 in the first direction and guide the received light to the reflector 220. The reflector 220 may reflect and emit the guided light in the second direction. In other words, as the light guide 200 is formed in the fixture 100, the fixture 100 may modify the traveling path of light emitted from the light source 50 and emit the light toward the outside in the modified traveling path. At the same time, the fixture 100 may fix predetermined components (e.g., the light guide 200, the light collector 210, and the reflector 220) that may be mounted to the fixture 100.

Also, in the fixture 100 including the light guide 200 according to an example embodiment, since the components of a light collecting module are integrally formed, cracks or gaps that may occur in the process of combining the components may be prevented. Therefore, light may be stably guided and emitted toward the outside, thereby forming a brighter and clearer light region.

FIG. 2A is a perspective view of a fixture 100 including a light guide 200 according to another example embodiment, and FIG. 2B is a partial cross-sectional view of the light guide 200 in the fixture 100 according to the example embodiment shown in FIG. 2A.

Referring to FIGS. 2A and 2B, the fixture 100 including the light guide 200 according to another example embodiment will be described in more detail. In this embodiment, configurations of components other than the light guide 200 are the same as those of the corresponding components the fixture 100 including the light guide 200 according to the previous embodiment, and thus detailed descriptions thereof will be omitted.

In the fixture 100 including the light guide 200 according to another embodiment, the light collector 210 of the light guide 200 is formed to be concave in a direction facing toward the light source 50.

When there are a plurality of light sources 50, the light collectors 210 may be formed in a number corresponding to the number of the light sources 50, and the each of the light collectors 210 may be formed to be concave in a direction facing toward each of the corresponding light sources 50. In this case, the light collectors 210 may be integrally formed on the first surface of the light guide 200.

In the fixture 100 including the light guide 200 according to another embodiment, the light collector 210 for receiving light emitted from the light source 50 may be provided on the first surface of the light guide 200 in a direction facing toward the light source 50.

In the fixture 100 including the light guide 200 according to another embodiment, the light collector 210 of the light guide 200 may be formed to be concave in a direction facing toward the light source 50. In other words, the light collector 210 may form a concave surface around the light source 50. As the light collector 210 forms a concave surface, the light collector 210 may receive light emitted from the light source 50 more effectively.

For example, light emitted from the light source 50 is emitted in a radial direction around the light source 50, and the light collector 210 may be formed to be concave to more effectively enclose light that is emitted from the light source 50 and proceeds in the radial direction.

At least one light source 50 may be provided. When there is one light source 50, the light collector 210 formed in the light guide 200 in the direction facing toward the light source 50 may have one concave surface in correspondence to the one light source 50.

When there are a plurality of light sources 50, the light collectors 210 may be formed in a number corresponding to the number of the light sources 50, and each of the light collectors 210 may be formed to be concave in a direction facing toward each of the corresponding light sources 50. In other words, when there are plurality of light sources 50, the light collectors 210 having concave surfaces may be formed in a number corresponding to the number of the light sources 50.

For example, in an example embodiment as shown in FIG. 2A, four light sources 50 may be arranged to emit light to the light guide 200, and the four light sources 50 may be spaced apart from one another. The four light sources 50 spaced apart from one another may emit light toward the light collectors 210 of the light guide 200.

Four light collectors 210 may be provided to correspond to the number of light sources 50, and each of the four light collectors 210 may be formed to be concave in a direction facing toward each of the corresponding light sources 50. In this case, a first light collector 211 corresponding to a first light source 501, among the four light sources 50, may be formed to be concave around the first light source 501 to enclose light emitted in the radial direction from the first light source 501, a second light collector 212 corresponding to a second light source 502, among the four light sources 50, may be formed to be concave around the second light source 502 to enclose light emitted in the radial direction from the second light source 502, a third light collector 213 corresponding to a third light source 503, among the four light sources 50, may be formed to be concave around the third light source 503 to enclose light emitted in the radial direction from the third light source 503, and a fourth light collector 214 corresponding to a fourth light source 504, among the four the light sources 50, may be formed to be concave around the fourth light source 504 to enclose light emitted in the radial direction from the fourth light source 504. In this case, the number of the light sources 501, 502, 503, and 504 and the number of the light collectors 210 corresponding thereto are not limited to four and may be variously changed as needed.

Each of the light collectors 210 may be integrally formed on the first surface of the light guide 200. For example, as shown in FIG. 2A, on the first surface of the light guide 200, the second light collector 212 may be formed by extending from the first light collector 211, the third light collector 213 may be formed by extending from the second light collector 212, and the fourth light collector 214 may be formed by extending from the third light collector 213. In other words, the first light collector 211 to the fourth light collector 214 may be integrally formed on the first surface of the light guide 200 by extending from one another.

As the light collector 210 corresponding to each light source 50 forms a concave surface around the each light source 50, the light collector 210 may effectively receive light emitted in the radial direction from the each light source 50.

It will be apparent to one of ordinary skill in the art that the numbers, the shapes, and the positions of components including the light source 50 and the light collector 210 may be changed as needed without being limited to the above descriptions and drawings.

Light received by the light collector 210 of the light guide 200 may be guided to the reflector 220. At this time, the light received by the light collector 210 may be refracted by the concave surface of the light collector 210 and guided to the reflector 220. The concave surface formed in the light collector 210 may have a curvature to efficiently guide the light received in the light collector 210 to the reflector 220.

FIG. 2B shows a schematic path of light emitted from the light source 50 in the fixture 100 according to another example embodiment. In a fixture 100 according to another example embodiment, the light guide 200 may guide light that is emitted and received from the light source 50 in the first direction and emit the received light in the second direction crossing the first direction.

The light collector 210 for receiving light emitted from the light source 50 may be formed to be concave on the first surface of the light guide 200 of the fixture 100 according to another example embodiment in a direction facing toward the light source 50. Light emitted from the light source 50 and received by the light collector 210 that is formed to be concave in the direction facing toward the light source 50 may be guided to the reflector 220 in the light collector 210.

From among the surfaces of the light guide 200, the second surface of the light guide 200, which is opposite to the first surface of the light guide 200 having formed thereon the light collector 210, and the bottom surface of the light guide 200 may integrally form the reflector 220, and the reflector 220 may reflect light guided by the light collector 210 in the second direction crossing the first direction. Light reflected by the reflector 220 in the second direction may travel away from the light guide 200, and then the light may be exposed to a user.

The bottom surface of the light guide 200 and the second surface of the light guide 200 may integrally form an inclined surface having a constant slope. Also, the bottom surface of the light guide 200 and the second surface of the light guide 200 may integrally form a curved surface in which the slope thereof changes as the distance from the bottom surface of the light guide 200 increases. Therefore, the reflector 220 may have a curvature to reflect light, guided in the first direction, in the second direction.

Here, the curved surface of the reflector 220 may be a concave surface and may have a pre-set curvature to reflect light, guided in the first direction, in the second direction. For example, referring to FIG. 2B, the first direction may be a direction in which light emitted from the light source 50 proceeds toward the light guide 200, and the second direction may be a direction in which light reflected by the reflector 220 of the light guide 200 proceeds out of the light guide 200.

Also, the reflector 220 may include a mirror surface capable of reflecting light with a surface roughness of $Ra \leq 1$.

FIG. 3 is a diagram showing an example of the light region 250 formed by light passed through the light guide 200 in the fixture 100 according to the example embodiment shown in FIGS. 2A and 2B.

Light emitted from each of the light sources 50 may be guided to the reflector 220 by each of the light collectors 210 that are formed to be concave around each of the light sources 50 to enclose light emitted in the radial direction from the each of the light source 50.

Light guided to the reflector 220 may be emitted in the second direction by the reflector 220 and form a plurality of light regions 250. In this case, the plurality of light regions 250 may have different characteristics from one another according to the properties of the light sources 50, the light collectors 210, and the reflectors 220, respectively. Since each of the plurality of light regions 250 may have different characteristics from one another, a user may modify the different characteristics of light regions 250 for various purposes.

For example, as shown in FIG. 3, light emitted from two light sources 50 may pass through corresponding light collectors 210 and reflectors 220 to form separate light regions 250, respectively. In this case, the plurality of light regions 250 may be distinguished from one another not only by types, colors, and/or brightness of the light sources 50, but also by curvatures of the light collector 210 and the reflector 220.

As light guided by the light guide 200 forms a plurality of light regions 250 that are distinguished from one another, various information may be displayed through the plurality of light regions 250.

For example, the plurality of light regions 250 may display a remaining battery power of a device including the fixture 100 according to an example embodiment, and operation states and functions of an electronic device including the fixture 100 may be displayed by combining light emissions of the plurality of light regions 250.

The numbers, the shapes, and the positions of components including the light source 50, the light collector 210, and the reflector 220 may be changed as needed without being limited to the above descriptions and drawings. Also, it will be apparent to one of ordinary skill in the art that information that may be displayed through the plurality of light regions 250 may also be variously changed without being limited to the above descriptions.

FIG. 4 is a diagram showing an aerosol generating device 1000 including the fixture 100 according to an example embodiment. The aerosol generating device 1000 according to an example embodiment may include the fixture 100 according to example embodiments, the fixture 100 including the light source 50 for emitting light toward the light guide 200 of the fixture 100; and a light emitting unit 300 that receives light from the light guide 200 of the fixture 100 and emits the light toward the outside.

The aerosol generating device 1000 according to an example embodiment may further include a printed circuit board (PCB) substrate 400, which may be mounted to the fixture 100 and fixed at a predetermined position in the aerosol generating device 1000.

Referring to FIG. 4, the aerosol generating device 1000 according to an example embodiment and the components included in the aerosol generating device 1000 will be described in more detail.

The aerosol generating device 1000 according to an example embodiment may be a heating-type aerosol generating device 1000. In this case, a cavity may be formed in the aerosol generating device 1000, and an aerosol may be generated by heating a cigarette inserted into the cavity. The aerosol generating device 1000 according to an example embodiment may include components for generating an aerosol therein.

The aerosol generating device 1000 according to an example embodiment may accommodate a liquid cartridge inside the aerosol generating device 1000 and may include a vaporizer for generating an aerosol by heating a liquid inside the liquid cartridge. The vaporizer for heating the liquid may also be referred to as a cartomizer or atomizer, but is not limited thereto. The aerosol generating device 1000 may accommodate the liquid cartridge and generate an aerosol through the vaporizer.

According to an example embodiment, the aerosol generating device 1000 may accommodate a cigarette and a liquid cartridge at the same time and may use the cigarette and the liquid cartridge together to generate an aerosol.

Specifically, when a cigarette is inserted into the aerosol generating device 1000, the aerosol generating device 1000 may operate a vaporizer to generate an aerosol from the vaporizer. The aerosol generated by the vaporizer may pass through the cigarette and be delivered to a user.

One of ordinary skill in the art would readily understand without a due difficulty that the aerosol generating device 1000 according to an example embodiment may further include other general-purpose components for generating an aerosol.

The aerosol generating device 1000 according to an example embodiment includes the light emitting unit 300, wherein the light emitting unit 300 may be provided on a surface of the aerosol generating device 1000 according to an example embodiment. The light emitting unit 300 may receive light from the light guide 200 of the fixture 100 according to the example embodiments located inside the aerosol generating device 1000 and expose the light toward the outside of the aerosol generating device 1000. The aerosol generating device 1000 according to an example embodiment may include the fixture 100 according to any one of the example embodiments described above with reference to FIGS. 1A, 1B, 2A, and 2B.

Since the process in which light emitted from the light source 50 is emitted toward the outside through the light guide 200 of the fixture 100 according to the example embodiments is identical to that described above, detailed descriptions thereof will be omitted.

According to an example embodiment, the light emitting unit 300 of the aerosol generating device 1000 may be formed at a position corresponding to that of the light guide 200 of the fixture 100 in the aerosol generating device 1000. There may also be a plurality of light emitting units 300, wherein the number of light emitting units 300 may correspond to the number of light guides 200 of the fixture 100 in the aerosol generating device 1000.

For example, as shown in FIG. 4, the aerosol generating device 1000 according to an example embodiment may include two light emitting units 300 corresponding to the number of the light guides 200 of the fixture 100 at positions corresponding to the positions of the light guides 200 in the aerosol generating device 1000. The two light emitting units 300 may display different information regarding the aerosol generating device 1000 according to an example embodiment.

FIG. 5 is a perspective view of the fixture 100 in the aerosol generating device 1000 according to the example embodiment shown in FIG. 4.

FIG. 5 shows the fixture 100 having mounted thereon the PCB substrate 400 in the aerosol generating device 1000 according to an example embodiment. The PCB substrate 400 may be mounted to the fixture 100 and fixed at a predetermined position in the aerosol generating device 1000. In this case, the PCB substrate 400 may include a groove, through which the light guide 200 protruding from the base 150 of the fixture 100 passes, as a part of the fixture 100 according to the example embodiments. However, the PCB substrate 400 according to the disclosure is not limited thereto.

The PCB substrate 400 may be mounted to the fixture 100 according to example embodiments. For example, the PCB substrate 400 may be insert-fitted to the fixture 100 or mounted to the fixture 100 via an adhesive material applied to the fixture. However, as long as the PCB substrate 400 may be stably mounted to the fixture 100, coupling methods are not limited thereto. The PCB substrate 400 may be mounted to the fixture 100 and electrically connected to the fixture 100. At this time, the PCB substrate 400 may be mounted to the fixture 100 and fixed at a predetermined position in the aerosol generating device 1000.

The fixture 100 according to the example embodiments may be coupled to the components of the aerosol generating device 1000 and fix the components at predetermined positions in the aerosol generating device 1000.

As described above, in the light guide 200 of the fixture 100 according to the example embodiments, the light collector 210 may receive light emitted from the light source 50 in the first direction and guide the received light to the reflector 220. The reflector 220 may reflect and emit the guided light in the second direction.

In other words, as the light guide 200 is formed in the fixture 100, the fixture 100 may not only fix components at predetermined positions in a device (e.g., aerosol generating device 1000) including the fixture 100, but also change the path of light emitted from the light source 50 and emit the light toward the outside.

FIGS. 6A and 6B are lateral cross-sectional views of the fixture 100 according to example embodiments based on positions of the light source 50.

In an example embodiment, the light source 50 of the aerosol generating device 1000 may be located on the fixture 100 or the PCB substrate 400.

As shown in FIG. 6A, when the light source 50 is located on the fixture 100, the PCB substrate 400 and the fixture 100 may be electrically connected to each other through an electrode 450. As the PCB substrate 400 is electrically connected to the fixture 100 through the electrode 450, power may be supplied to the light source 50 on the fixture 100. The light source 50 received power from the PCB substrate 400 may emit light toward the light guide 200 of the fixture 100.

As shown in FIG. 6B, the light source 50 may be located on the PCB substrate 400. When the light source 50 is located on the PCB substrate 400, the light source 50 may receive power directly from the PCB substrate 400. The light source 50 received power from the PCB substrate 400 may emit light toward the light guide 200 of the fixture 100.

The aerosol generating device 1000 according to another example embodiment may further include a controller (not shown) and a battery (not shown). In this case, the controller may control the light source 50 to control a display of the remaining battery power by using the light emitting unit 300. Also, the controller may control the light source 50 to control a display of ON/OFF operation state(s) of the aerosol generating device by using the light emitting unit 1000.

The aerosol generating device 1000 according to another example embodiment may further include a controller, wherein the controller may control the operations of the components in the aerosol generating device 1000. For example, the controller may control a type, blinking, and intensity of light emitted from the light source 50 by controlling power supplied to the light source 50.

The light emitting unit 300 may receive light from the light guide 200 of the fixture 100 according to the example embodiments located inside the aerosol generating device 1000 and expose the light toward the outside of the aerosol generating device 1000. The controller may control light emitted through the light emitting unit 300 by controlling the light source 50 in the aerosol generating device 1000.

For example, the controller may control a display of the remaining battery power through the light emitting unit 300 by using light emitted by the light emitting unit 300 by controlling the light source 50. After measuring the remaining battery power, the remaining battery power may be displayed by adjusting at least one of light intensity of the light source 50, the number of light sources 50 to emit light, and the type of the light source 50.

The controller may also control a display of the ON/OFF operation state of the aerosol generating device 1000 by using light emitted by the light emitting unit 300 by controlling the light source 50. The ON/OFF operation state of the aerosol generating device 1000 may be displayed by adjusting at least one of light intensity of the light source 50, the number of light sources 50 to emit light, and the type of the light source 50.

The characteristics of the light source 50 that may be controlled by the controller are not limited to those stated above, and information regarding the aerosol generating device 1000 that may be displayed by adjusting the light source 50 is also not limited thereto.

In the fixture 100 including the light guide according to example embodiments, the light collector 210 that condenses light to be guided by the light guide 200 and the reflector 220 for reflecting light to adjust a path of the light are integrally formed. Accordingly, since no separate space is needed for components (e.g., the light collector 210 and the reflector 220) of each light collecting module, the internal space of a device (e.g., the aerosol generating device 1000) on which the light collecting module is mounted may be efficiently utilized.

Also, since the light collector 210 and the reflector 220 are integrally formed, cracks or gaps that may be formed in or between components of the light collecting module in the process of coupling components to one another may be prevented. Therefore, light may be stably guided and emitted toward the outside, thereby forming a brighter and clearer light region.

The aerosol generating device 1000 according to an example embodiment may also include the fixture 100 according to example embodiments to efficiently utilize the internal space and generate a brighter and clearer light region. Also, the fixture 100 including a light guide according to example embodiments may not only guide light, but also fix the components inside the aerosol generating device 1000.

It should be understood that example embodiments described herein should be considered in a descriptive sense only and not for purposes of limitation. Descriptions of features or aspects within each embodiment should typically be considered as available for other similar features or aspects in other example embodiments. While one or more examples embodiments have been described with reference to the figures, it will be understood by those of ordinary skill in the art that various changes in form and details may be made therein without departing from the spirit and scope of the disclosure as defined by the following claims.

The invention claimed is:

1. A fixture comprising:
   a base; and
   a light guide positioned on the base, and is configured to receive light emitted from a light source in a first direction and guide the received light to be emitted in a second direction crossing the first direction,
   wherein a light collector configured to receive the light emitted from the light source is positioned on a first surface of the light guide, the first surface facing the light source, and
   wherein the light collector has a concave shape toward the light source.

2. The fixture of claim 1, further comprising:
   a reflector configured to reflect light guided to the reflector by the light guide, the reflector positioned on a second surface and a bottom surface of the light guide, the second surface being opposite the first surface,
   wherein the light collector receives the light emitted from the light source in the first direction and guide the received light to the reflector, and the reflector reflects and emits the guided light in the second direction.

3. The fixture of claim 2, wherein the reflector has a curvature to reflect the light, guided to the reflector by the light guide in the first direction, in the second direction.

4. The fixture of claim 2, wherein the reflector comprises a mirror surface.

5. The fixture of claim 2, wherein the light collector comprises a plurality of light collectors respectively corresponding to a plurality of light sources, and
   each of the plurality of light collectors is configured to have a concave shape in a direction facing toward each of the corresponding plurality of light sources.

6. The fixture of claim 5, wherein the reflector is further configured to reflect light, emitted from each of the plurality of light sources and guided to the reflector by the light guide via each of the corresponding plurality of light collectors, in the second direction.

7. The fixture of claim 1, wherein the light guide comprises a protrusion protruding in the second direction from the base.

8. The fixture of claim 1, wherein the fixture comprises a plurality of light guides.

9. The fixture of claim 1, wherein a surface of the light guide facing toward the second direction comprises fine projections.

10. The fixture of claim 1, wherein the light guide comprises a light-transmitting material.

11. The fixture of claim 10, wherein the light-transmitting material comprises a scatterer.

12. An aerosol generating device comprising:
   the fixture including the light guide of claim 1;
   the light source configured to emit the light toward the light guide of the fixture; and
   a light emitting unit configured to receive light from the light guide of the fixture and transmit the light toward an outside.

13. The aerosol generating device of claim 12, further comprising a printed circuit board (PCB) circuit board,
   wherein the PCB circuit board is mounted to the fixture and is fixed at a predetermined position in the aerosol generating device.

14. The aerosol generating device of claim 12, further comprising a controller, and a battery,
   wherein the controller is configured to control the light source to control a display of a remaining battery power by using the light emitting unit.

* * * * *